United States Patent [19]

Matsuyama et al.

[11] Patent Number: 4,686,147
[45] Date of Patent: Aug. 11, 1987

[54] MAGNETIC HEAD AND METHOD OF PRODUCING THE SAME

[75] Inventors: Haruhiko Matsuyama, Hiratsuka; Fusaji Shoji, Yokohama; Shunichiro Kuwazuka, Odawara, all of Japan

[73] Assignee: Hitachi, Ltd., Tokyo, Japan

[21] Appl. No.: 829,824

[22] Filed: Feb. 18, 1986

[30] Foreign Application Priority Data

Feb. 18, 1985 [JP] Japan .................................. 60-28274
Jul. 24, 1985 [JP] Japan ................................ 60-161807

[51] Int. Cl.⁴ ............................................... G11B 5/40
[52] U.S. Cl. ...................................... 428/447; 360/119; 360/120; 360/121; 360/125; 427/131; 427/132; 428/473.5; 428/450; 428/694; 428/900
[58] Field of Search ..................... 428/694, 695, 473.5, 428/900, 447, 450; 427/131, 132; 360/135, 120, 119, 121, 125

[56] References Cited

U.S. PATENT DOCUMENTS 3,544,982 12/1970 Hanak ................................ 360/120
4,589,043 5/1986 Grundtner ........................ 360/121

OTHER PUBLICATIONS

P. A. Albert, "Free-Standing Magnetic Thin, Flexible Insulating Layers", *IBM Tech. Disclosure Bulletin,* vol. 14 (No. 5) p. 1510, 1971.

*Primary Examiner*—Ellis P. Robinson
*Attorney, Agent, or Firm*—Antonelli, Terry & Wands

[57] ABSTRACT

A highly reliable magnetic head which exhibits excellent magnetic characteristics and is free from film defects can be produced by using a silicone-containing polyimide resin as a material for insulation layers to thereby form homogeneous and flat insulation layers. Such a polyimide resin is suitable for other multi-layered stereo-wiring structures.

6 Claims, 1 Drawing Figure

MAGNETIC HEAD AND METHOD OF PRODUCING THE SAME

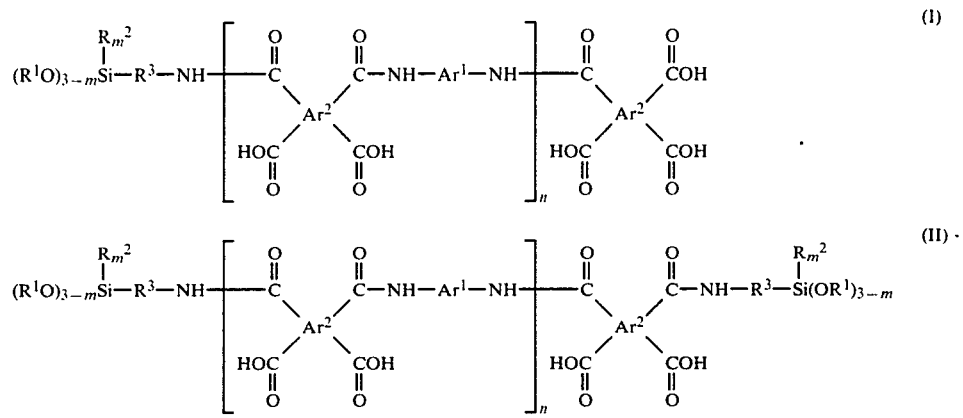

BACKGROUND OF THE INVENTION

The present invention relates to a magnetic head and a method of producing the same. Particularly, it relates to a thin film magnetic head characterized by having an insulation layer made of a silicone-containing polyimide resin.

It has been proposed in Japanese Patent Laid-Open Nos. 135713/1977 and 90834/1981 that a condensation or addition polymerization type polyimide is applied to an insulation layer of a magnetic head.

However, an addition polymerization type polyimide exhibits a poor solubility in a solvent. Therefore, it is difficult to obtain a homogeneous or relatively thick coating film from a solution thereof, thus being unpractical.

On the other hand, a condensation polymerization type polyimide is free from the above disadvantage, but generates a low molecular compound such as water by the condensation at curing time to cause film defects such as blister of an insulation layer, frequently resulting in inferiority of the thin film magnetic head to which such a polyimide is applied, for example, disconnection, burnout or short-circuiting. Further, a condensation polymerization type polyimide is difficultly melted at the time of curing and heating, so that the surface of the polyimide film has unevenness. Accordingly, the magnetic film which is formed on the polyimide film has also unevenness, so that no high permeability could be attained (Japanese Patent Laid-Open Nos. 90834/1981 and 135713/1977).

Further, any polyimide has a poor adhesiveness, so that a magnetic head having an insulation layer made of such a polyimide has problems in reliability.

SUMMARY OF THE INVENTION

The present invention aims at overcoming the above disadvantages of the prior art and providing a magnetic head which has an insulation layer having a flat surface and a good adhesiveness and a method of producing the same.

The above aims can be attained by making an insulation layer of a silicone-containing polyimide resin.

That is to say, the aims can be particularly attained by using a heat-cured product of an end capped polyimide precursor with silicone compound represented by the following general formula (I) and/or (II) as the above silicone-containing polyimide resin. A precursor represented by the general formula (I) or a precursor represented by the general formula (II) or a mixture of the both may be used.

When a mixture of the both is used, the ratio of (I) and (II) is not particularly limited.

In the above general formula,
(i) $R^1$, $R^2$ and $R^3$ each stand for an organic radical having 1 to 6 carbon atoms,
(ii) when $Ar^1$ is at least one radical selected from among

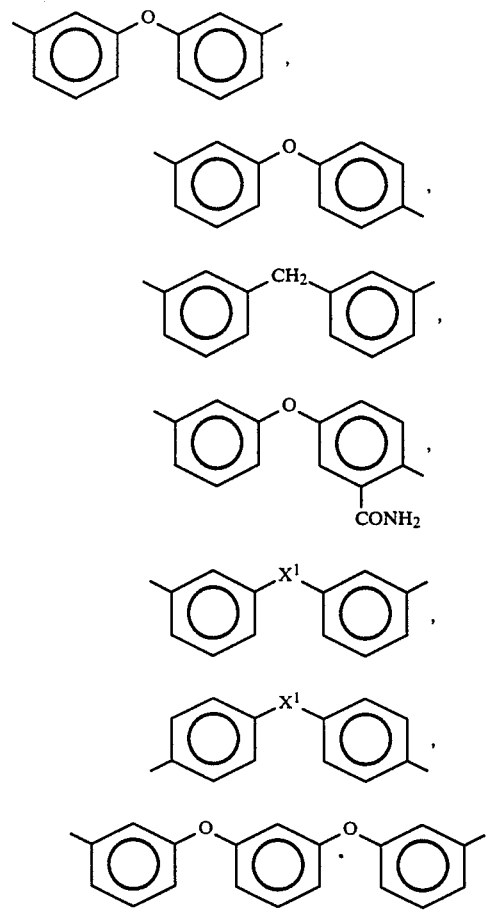

and

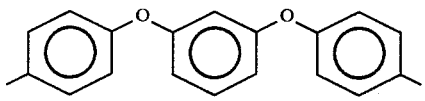

Ar² is at least one radical selected from among

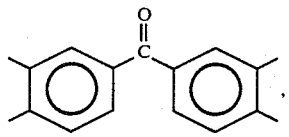

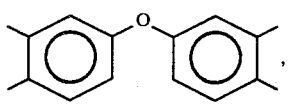

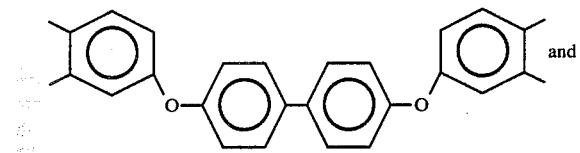 and

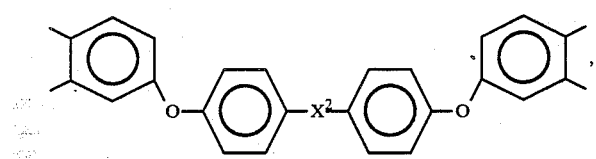

(iii) when Ar¹ is at least one radical selected from among

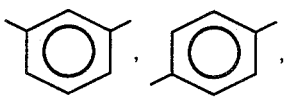

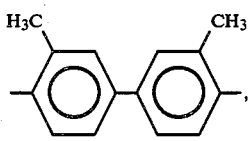

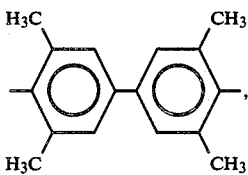

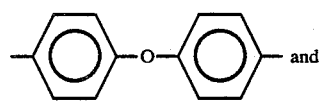 and

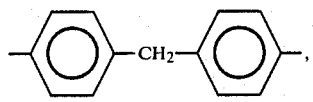

Ar² is at least one radical selected from among

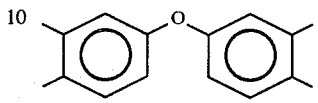

 and

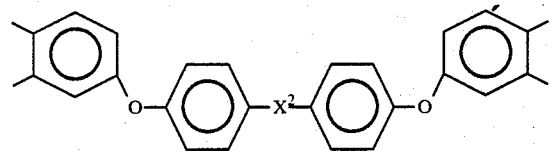

(iv) X¹ stands for —SO— or —CO—,
(v) X² stands for

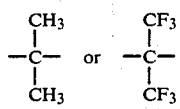

(vi) m stands for 0, 1 or 2, and
(vii) n stands for a positive number of 1 to 100.

DETAILED DESCRIPTION OF THE PREFERRED EMBODIMENTS

Figure 1:
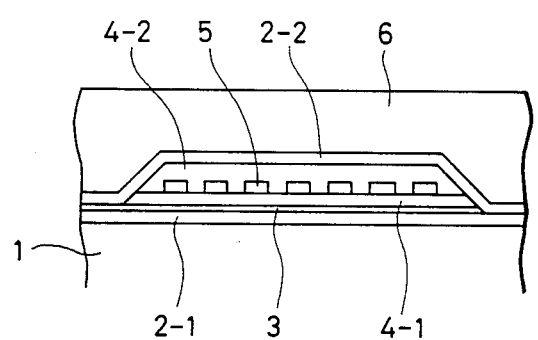
FIG. 1 is a partial crosssectional view of a thin film magnetic head.

Now, the present invention will be described in further detail.

Representative examples of the above R¹ include methyl, ethyl, propyl, butyl and phenyl radicals and those of the above R² include methyl, ethyl, butyl, phenyl, methoxy, ethoxy, propoxy, butoxy and phenoxy radicals, while those of the R³ include methylene, ethylene, propylene, butylene and phenylene radicals.

Further, the above end capped polyimide precursor with silicone compound exhibits a high solubility in a solvent and therefore can form a varnish of polyamic acid which is homogeneous and has a high concentration, thus forming a thick film easily. Preferred examples of the solvent include polar solvents, for example, N-methyl-2-pyrrolidone, N-benzyl-2-pyrrolidone, N,N-dimethylacetamide, N,N-dimethylformamide and dimethyl sulfoxide. In spin coating which will be described below, N-methyl-2-pyrrolidone and N,N-dimethylacetamide are particularly preferred. The concentration of the varnish is generally 10 to 50% by weight, preferably 15 to 35% by weight. If the concentration is less than 10%, no thick film will be obtained, while if it is more than 50%, the varnish will be too viscous to form a coating film having a uniform thickness on the surface of a substrate.

The magnetic head according to the present invention is a head comprising the first magnetic layer, an insulating gap layer, the first insulation layer, a conductor layer, the second insulation layer, the second magnetic layer and a protective layer which are stacked on a substrate in order, characterized in that the first and second insulation layers are formed by applying an end capped polyimide precursor with silicone compound and curing it in a non-oxidizing atmosphere, preferably in vacuum.

The first feature of the present invention is that an insulation layer is formed by the use of an end capped polyimide precursor with silicone compound of condensation polymerization type which exhibits a high solubility in a solvent. An addition type polyimide is synthesized from a polyamic acid which is a precursor thereof. However, a part of the terminal reactive group reacts during this synthesis to generate insoluble components. According to the present invention, an end capped polyimide precursor with silicone compound of condensation polymerization type which exhibits a high solubility is used. Therefore, a homogeneous solution having a high concentration can be prepared, so that a thick and homogeneous coating film can be easily formed. Further, such an end capped polyimide precursor has been found to exhibit an adhesiveness of 3 to 10 times as much as that of a polyimide having no silicone radical, which is a reason why the end capped polyimide precursor is used in the present invention.

In the production of a magnetic head of the present invention, an insulation film can be formed by curing the above end capped polyimide precursor in a non-oxidizing atmosphere, preferably in vacuum, which is the second feature of the present invention.

According to the present invention, water is generated during the curing in the formation of an insulation film, because an end capped polyimide precursor of condensation polymerization type is used. The generation of water generally tends to cause film defects such as blister. However, according to the present invention, it is possible to prevent the film suffering from defects such as blister, even if water is generated during the curing, by carrying out the curing in vacuum.

Now, the improvement in the magnetic characteristics of the magnetic head according to the present invention will be described.

The third feature of the present invention is that the level difference of the substrate can be evened in a high accuracy by heat-curing a film of the polyimide precursor, thus improving the magnetic characteristics of the magnetic head.

The fourth feature of the present invention is that the heat resistance of the insulation layer is remarkably enhanced by curing the insulation film, preferably in vacuum, as compared with the case where the curing is carried out in air or a nitrogen atmosphere. Therefore, the properties of the insulation layer do not change by thermal hysteresis in sputtering a magnetic layer or the like, so that the substrate can be heated to higher temperature, thus improving the magnetic characteristics.

According to the present invention, an insulation layer of a magnetic head can be formed by applying a varnish of the above polyamic acid on a substrate which has unevenness and is set up with a magnetic layer or a conductor layer and heat-curing the varnish to form a polyimide resin film. The application may be carried out by spin coating method, roll coating method, dipping method, printing method or the like. Spin coating method is most preferred in order to form a film uniformly all over the surface of the substrate with a high productivity. The heat-curing is carried out at a temperature of 140° to 400° C., preferably 250° to 400° C., for 10 to 180 minutes, preferably 30 to 120 minutes and in a non-oxidizing atmosphere, for example, in an inert gas atmosphere (such as Ar or $N_2$) or under a reduced pressure of 0.1 Pa or below, or in vacuum. Further, the silicone-containing polyimide resin obtained by the heat-curing exhibits an excellent adhesiveness to the substrate etc.

FIG. 1 shows a preferred embodiment of the magnetic head according to the present invention. FIG. 1 is a partial cross-sectional view of a thin film magnetic head. As shown in FIG. 1, this thin film magnetic head is produced by a process which comprises (a) making an insulating gap layer 3 of alumina or the like on the first magnetic layer 2-1 made of permalloy (Ni-Fe alloy having high permeability) or the like formed on a substrate 1, (b) applying a polyimide precursor represented by the above-mentioned general formula (I) or (II) or a mixture thereof all over the surface of the substrate by spin coating uniformly, (c) heat-curing the precursor to form a polyimide insulation layer 4-1, (d) making a conductor layer 5 of aluminum, copper, gold or the like, (e) forming the second insulation layer 4-2 similar to the above insulation layer 4-1, and (f) forming the second magnetic layer 2-2 and a protective layer 6 made of an inorganic insulator such as alumina in order. The obtained magnetic head produced by such a process is a one-layer coil magnetic head. A multilayer multiturn coil magnetic head can be produced by forming conductor layers and insulation layers on the second insulation layer alternately. The patterning of the polyimide insulation layer may be carried out by the use of the well-known etching solution of hydrazine hydrate system (for example, hydrazine hydrate/ethylenediamine of 7/3 by volume) or oxygen plasma.

The mixture of silicone-containing polyimide precursor [I] and [II] to be used in the present invention can be prepared as a solution of a polyimide precursor, for example, by reacting a mixture comprising 99.5 to 90 molar % of an organic diamine represented by the general formula (A) and 0.5 to 10 molar % of an aminosilane represented by the general formula (B)

$$H_2N-Ar^1-NH_2 \qquad (A)$$

$$\begin{matrix} & R_m^2 & \\ & | & \\ H_2N-R^3-&Si(OR^1)_{3-m} & \end{matrix} \qquad (B)$$

with an amount nearly equimolar to that of the above diamine (A) of an organic tetracarboxylic acid dianhydride represented by the general formula (C)

in an organic polar solvent such as N-methyl-2-pyrrolidone or N,N-dimethyl acetamide at 0° to 70° C. for 0.5 to 8 hours (Synthesis method (A)). The concentration of the polymer in the obtained solution is 10 to 30% by weight. In the above formulas (A), (B) and (C), when Ar¹ is a radical selected from among
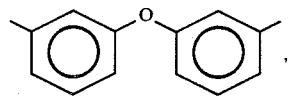,
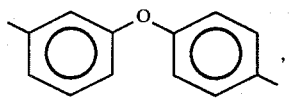,
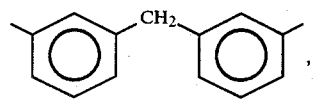,
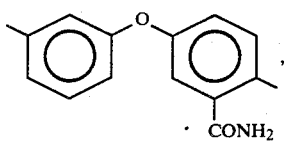,
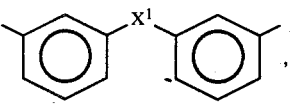,
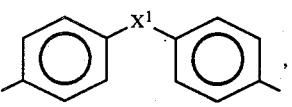,
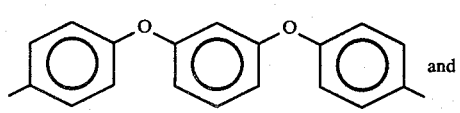 and
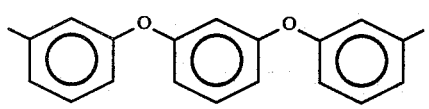,
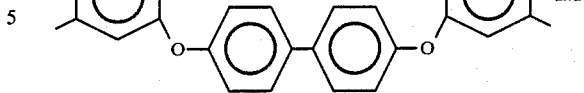 and
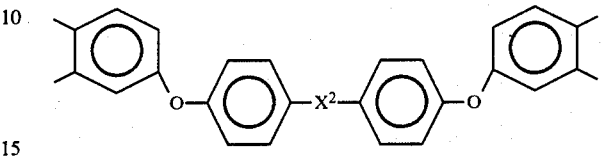
or when Ar¹ is a radical selected from among
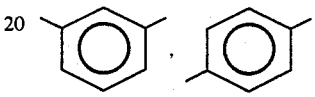,
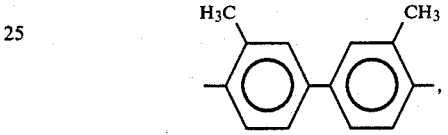,
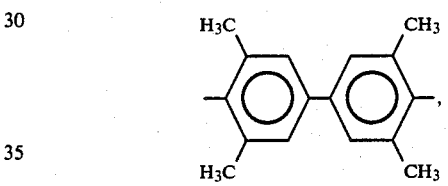,
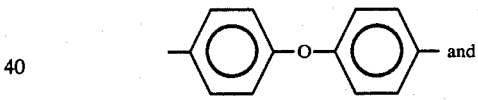 and
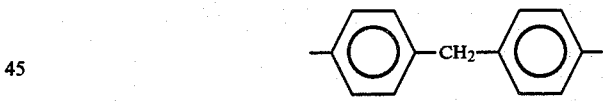
Ar² is a radical selected from among
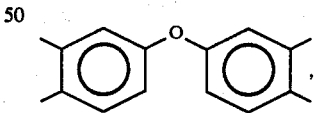,
 and
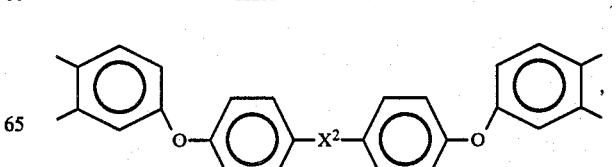,
Ar² is a radical selected from among
,
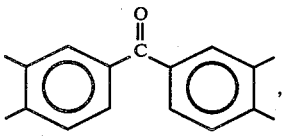,
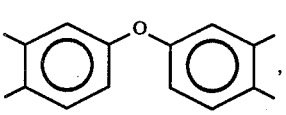, $R^1$, $R^2$ and $R^3$ each stand for an organic radical having 1 to 6 carbon atoms; $X^1$ stands for —SO$_2$— or —CO—; $X^2$ stands for

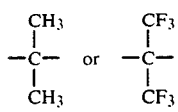

and m is 0, 1 or 2.

Now, the process for preparing the silicone-containing polyimide precursor (II) to be used in the present invention will be described (Synthesis method B).

0.495 to 0.30 mol of an organic diamine represented by the general formula (A):

 (A)

is reacted with 0.505 to 0.70 mol of an organic tetracarboxylic acid dianhydride represented by the general formula (C):

(C)

in an organic polar solvent such as N-methyl-2-pyrrolidone or N,N-dimethylacetamide at 0° to 70° C. for 0.5 to 8 hours to obtain a solution of polyimide precursor. The obtained solution has a polymer concentration of 10 to 30% by weight. In the above formulas (A) and (C), when Ar$^1$ is a radical selected from among

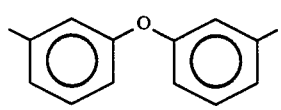,

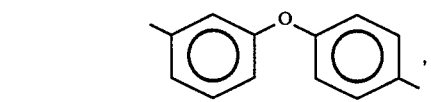,

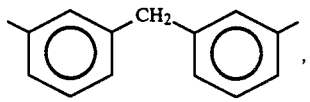,

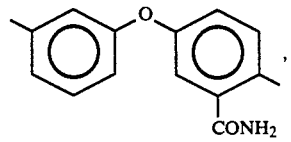,

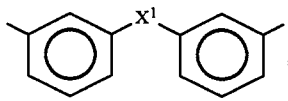,

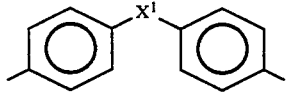,

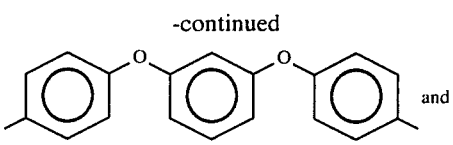 and

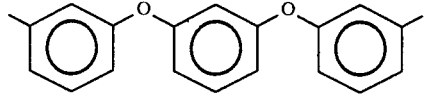

Ar$^2$ is a radical selected from among

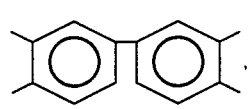,

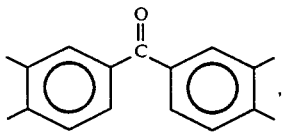,

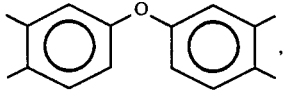,

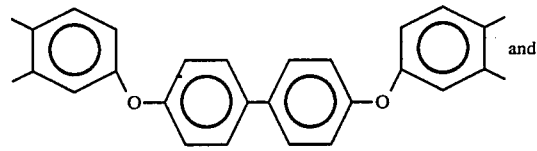 and

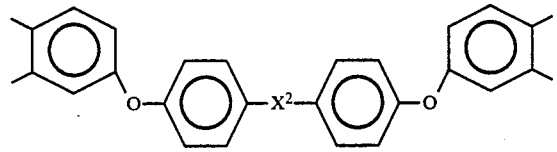

or when Ar$^1$ is a radical selected from among

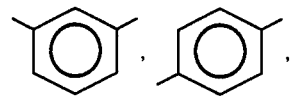,

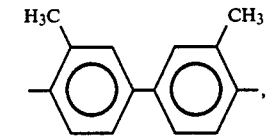,

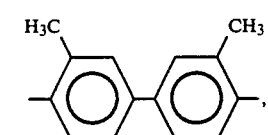,

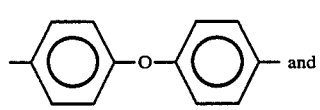 and

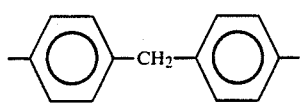

Ar₂ is a radical selected from among

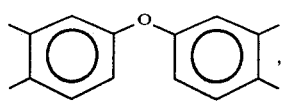

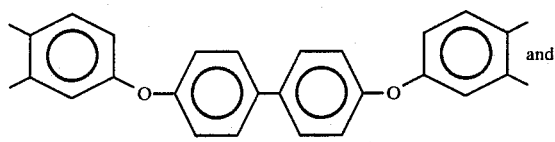

and

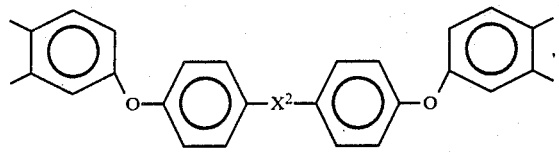

R₁, R₂ and R₃ each stand for an organic radical having 1 to 6 carbon atoms; X¹ stands for —SO₂— or —CO—; X₂ is

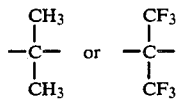

and m is 0, 1 or 2.

The above obtained polyimide precursor is represented by the general formula (D):

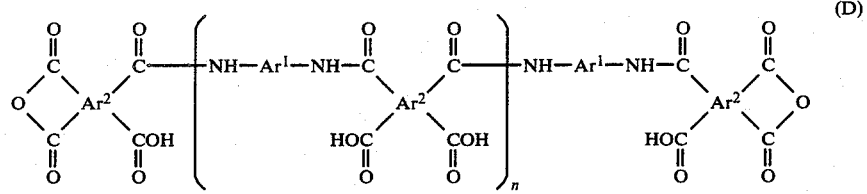

where Ar¹ and Ar² are as defined in the general formulas (A) and (C) and n is 1 to 100.

The silicone-containing polyimide precursor (II) is prepared by reacting a solution of a precursor represented by the general formula (D) in an organic solvent selected from among the same solvents as the ones to be used in the preparation of a solution of the above polyimide precursor (D) (having a polymer concentration of 10 to 30% by weight) with an aminosilane compound represented by the general formula (B):

wherein R¹, R² and R³ are as defined in the general formula (B) in the synthesis method (A) and m is 0, 1 and 2, at 0° to 60° C. for 0.5 to 8 hours with a ratio by weight of the precursor (D) to the aminosilane compound (B) of between 99.5:0.5 and 90:10, more preferably between 99:1 and 95:5.

The silicone-containing polyimide precursor (II) to be used in the present invention can be prepared as above.

In the preparation of the silicone-containing polyimide precursor to be used in the present invention, a mixed organic diamine obtained by adding 1 to 20 molar % of other organic diamine (such as 4,4'-diaminodiphenyl ether or 4,4'-diaminodiphenyl ether-3-carbonamide) to an organic diamine (A) used as the monomer component may be employed, or a mixed organic tetracarboxylic acid dianhydride obtained by adding 1 to 50 molar % of pyromellitic dianhydride to 99 to 50 molar % of an organic tetracarboxylic acid dianhydride (C) used as the monomer component may be employed. The use of such a mixture enhances the glass transition temperature, while keeping evenness, thus more effectively preventing the film suffering from blister after the formation of a magnetic layer made of permalloy or the like.

Examples of the organic diamine (A) to be used in the present invention include 3,3'-diaminodiphenyl ether (3,3'-DDE), 3,4'-diaminodiphenyl ether (3,4'-DDE), 3,3'-diaminodiphenylmethane (3,3'-DDM), 3,3'-diaminodiphenyl sulfone (3,3'-DDS), 4,4'-diaminodiphenyl sulfone (4,4'-DDS), 3,4'-diaminodiphenyl-3'-carbonamide (DDEC), 3,3'-diaminobenzophenone, 4,4'-diaminobenzophenone, 1,3-bis(3-aminophenoxy)benzene, 1,3-bis(4-aminophenoxy)benzene, p-phenylenediamine, m-phenylenediamine, 3,3'-dimethylbenzidine, 3,3', 5,5'-dimethylbenzidine, 4,4'-diaminodiphenyl ether (4,4'-DDE) and 4,4'-diaminodiphenylmethane (4,4'-DDM). Examples of the organic tetracarboxylic acid dianhydride (C) include 3,3',4,4'-benzophenonetetracarboxylic dianhydride (BTDA), 3,3',4,4'-biphenyltetracarboxylic dianhydride (BPDA), 3,3',4,4'-diphenylethertetracarboxylic dianhydride (DEDA), 4,4'-bis(3,4-dicarboxyphenoxy)diphenyl dianhydride, 2,2-bis[4-(3,4-dicarboxyphenoxy)phenyl]propane dianhydride, 2,2-bis[4-(3,4-dicarboxyphenoxy)phenyl]hexafluoropropane dianhydride and pyromellitic dianhydride (PMDA).

Examples of the aminosilane compound (B) to be used in the present invention include 3-aminopropyltrimethoxysilane, 3-aminopropyldimethoxymethylsilane, 3-aminopropylmethoxydimethylsilane, 3-aminopropyltriethoxysilane, 3-aminopropyldiethoxymethylsilane, 3-aminopropylethoxydimethylsilane, 3-aminopropyltri-n-propoxysilane, 3-aminopropyldi-n-propoxysilane, 3-aminopropyl-n-propoxysilane, 3-aminopropyltributoxysilane, 3-aminopropyldi-n-butoxymethylsilane, 3-aminopropyl-n-butoxydimethylsilane, m-aminophenyltrimethoxysilane, m-aminophenyldimethoxymethylsilane, m-aminophenylmethoxydimethylsilane, p-aminophenyltri-n-propoxysilane, p-aminophenyl-di-n-propoxymethylsilane and p-aminophenyl-n-propoxydimethylsilane.

According to the present invention, an organic polar solvent is used in the preparation of the end capped polyimide precursor with silicone compound. Examples of the organic polar solvent include N-methyl-2-pyrrolidone (NMP), N,N-dimethylacetamide (DMAc) and N,N-dimethylformamide.

The present invention will be described in further detail by the following Examples.

EXAMPLE 1

(1) Preparation of a solution of silicone-containing polyimide precursor 8.6505 g (0.0432 mol) of 3,4'-diaminodiphenyl ether, 1.1677 g (0.0048 mol) of 3,4'-diaminodiphenyl ether-3'-carbonamide, 0.4430 g (0.002 mol) of 3-aminopropyltriethoxymethylsilane and 40 g of N,N-dimethylacetamide, all of which had been purified respectively, were placed in a 300 ml three-necked flask fitted with a thermometer, a stirrer and a calcium chloride drying tube. The content was sufficiently stirred and the flask was cooled in an ice bath. 16.106 g (0.05 mol) of purified 3,3',4,4'-benzophenonetetracarboxylic dianhydride was stepwise added to the flask over 30 to 40 minutes, while keeping the reaction mixture at approximately a room temperature (25° C.). The dianhydride adhering to the wall of the flask was washed with 39.1 g of purified N,N-dimethylacetamide and added, followed by stirring for one hour. The mixture was heated to a liquid temperature of 70° C. in an oil bath of 65° to 75° C. After the temperature had reached 70° C., the mixture was stirred for about 8 hours (which corresponds to the time required for the polyimide precursor to reach a specified viscosity at 25° C.) The obtained solution had a viscosity of 21 poise at 25° C. (as determined by a viscometer of E-type made by Tokyo Keisoku Ltd.) and the obtained silicone-containing polyimide precursor had a number-average molecular weight ($\overline{M_n}$) of about 19,000. The preparation of silicone-containing polyimide precursor solution in this Example is corresponding to the above described synthesis method (A).

(2) Preparation of magnetic head

An aluminum layer having a thickness of 10 μm was stacked by sputtering on a substrate 1 made of Al$_2$O$_3$-TiC (a sintered product of alumina-titanium carbide mixture) and having a thickness of 4 mm and a diameter of 3 inch. A permalloy layer having a thickness of 2 μm was stacked by sputtering on the alumina layer and patterned by photoetching method to form the first magnetic layer 2-1. An alumina layer of a thickness of 0.5 μm was stacked by sputtering and patterned by photoetching method to form an insulating gap layer 3 made of alumina. The silicone-containing polyimide precursor solution (of a polymer solid content of 25% by weight) obtained in (1) of Example 1 was applied by spin coating and heat-cured under a reduced pressure of $10^{-3}$ to $10^{-4}$ Pa. The heat curing was carried out by heating it at 200° C. for 30 minutes and at 350° C. for 30 minutes.

The cured film was patterned with an etching solution comprising a mixture of hydrazine hydrate and ethylenediamine with a ratio by volume of 7:3 in a film thickness of 1.5 μm to form the first insulation layer 4-1. A copper layer of a thickness of 1.5 μm was stacked on the layer 4-1 by sputtering, and patterned by photoetching method to form a conductor 5. According to the same procedure as that of the formation of the first insulation layer 4-1, the second insulation layer of a thickness of 4 μm 4-2 was formed. The second magnetic layer of a thickness of 2 μm 2-2 was formed on the layer 4-2 in the same manner as that of the preparation of the first magnetic layer 2-1. Then, an alumina layer of a thickness of 30 μm was stacked by sputtering to form a protective layer 6.

The above produced thin film magnetic head had the second magnetic layer 2-2 having a remarkably flat surface (with the height of an undulation of 0.15 μm or below—hereinafter, the term "flatness" refers to this height) and had a high permeability and a good magnetic property. The obtained magnetic head was subjected to thermal cycle test which comprises exposing it at room temperature for 30 minutes and at 350° C. for 30 minutes alternately. No film defects such as peeling were observed in the insulation layer, thus obtaining remarkably excellent results in terms of reliability.

EXAMPLE 2

The same procedure as that described in Example 1 was repeated except that the monomer composition Nos. 1 to 10 shown in Table 1 were used to prepare silicone-containing polyimide precursors and that the first and second insulation layers 4-1 and 4-2 were formed by the use of these precursors, thus producing thin film magnetic heads. The second magnetic layer of these heads was examined for flatness, magnetic characteristics, characterization of filming and film defects to obtain the results in Table 2. All of the obtained thin film magnetic heads exhibited good results.

TABLE 1

| No. | Synthesis method | Monomer Moles end capped reagent | Moles diamine | Moles dianhydride | Weight percent polymer in solvent | $\overline{M_n}$ | Polymer Formula |
|---|---|---|---|---|---|---|---|
| 1 | A | 3-aminopropyldiethoxymethylsilane (0.002) | 3,4'-DDE (0.0432) DDEC (0.0048) | BTDA (0.05) | 25 in DMAc | 18800 | [I] + [II] |
| 2 | A | 3-aminopropyltripropoxysilane (0.002) | 3,4'-DDE (0.0432) DDEC (0.0048) | BTDA (0.05) | 25 in DMAc | 18500 | [I] + [II] |
| 3 | A | 3-aminopropyltributoxysilane (0.002) | 3,4'-DDE (0.0432) DDEC (0.0048) | BTDA (0.05) | 25 in DMAc | 18600 | [I] + [II] |
| 4 | A | 3-aminopropyldiethoxymethylsilane (0.003) | 3,4'-DDE (0.0235) DDEC (0.0235) | BTDA (0.033) PMDA (0.017) | 20 in DMAc | 17000 | [I] + [II] |
| 5 | A | 3-aminopropyldiethoxymethylsilane (0.004) | 3,4'-DDE (0.023) DDEC (0.023) | BTDA (0.033) PMDA (0.017) | 20 in DMAc | 16500 | [I] + [II] |
| 6 | A | 3-aminopropyldiethoxymethylsilane | 3,4'-DDE (0.0899) | BTDA (0.0551) PMDA (0.0367) | 27 in DMAc | 18700 | [I] + [II] |

TABLE 1-continued

| No. | Synthesis method | Monomer Moles end capped reagent | Moles diamine | Moles dianhydride | Weight percent polymer in solvent | $\overline{Mn}$ | Polymer Formula |
|---|---|---|---|---|---|---|---|
| 7 | A | 3-aminopropyldiethoxy-methylsilane (0.002) | 3,3'-DDE (0.0899) | BTDA (0.0459) PMDA (0.0459) | 27 in DMAc | 19200 | [I] + [II] |
| 8 | A | 3-aminopropyldiethoxy-methylsilane (0.002) | 3,3'-DDM (0.0899) | BPDA (0.0918) | 27 in DMAc | 19500 | [I] + [II] |
| 9 | A | 3-aminopropyldiethoxy-methylsilane (0.002) | 3,3'-DDS (0.0899) | BTDA (0.0918) | 27 in DMAc | 7600 | [I] + [II] |
| 10 | A | 3-aminopropyl-tributoxysilane (0.004) | DDEC (0.046) | BPDA (0.0918) | 27 in DMAc | 6800 | [I] + [II] |

TABLE 2

| No. | Flatness ($\mu$m) | Adhesiveness (peeling strength, g/cm) Si wafer surface | sputtered alumina surface | Characterization of filming | Film defect | Magnetic characteristics |
|---|---|---|---|---|---|---|
| 1 | 0.21 | >500 | 385 | good | Not observed | good |
| 2 | 0.20 | >500 | 370 | good | Not observed | good |
| 3 | 0.23 | >500 | 410 | good | Not observed | good |
| 4 | 0.32 | >500 | 400 | good | Not observed | good |
| 5 | 0.25 | >500 | 395 | good | Not observed | good |
| 6 | 0.26 | >500 | 415 | good | Not observed | good |
| 7 | 0.31 | >500 | 388 | good | Not observed | good |
| 8 | 0.22 | >500 | 399 | good | Not observed | good |
| 9 | 0.16 | >500 | 416 | good | Not observed | good |
| 10 | 0.18 | >500 | 400 | good | Not observed | good |

EXAMPLE 3

The heat resistance and adhesiveness of the resin prepared according to the present invention will be described here.

The same solution of polyamic acid in dimethylacetamide (having a resin content of 30% by weight, a number-average molecular weight of 6000 and n of about 9.8) as the one used in Example 1 was applied on a silicon wafer having a diameter of 3 inch or a sputtered wafer obtained by stacking an alumina layer of a thickness of 10 $\mu$m on such a silicon wafer by sputtering and cured by heating at 350° C. for 30 minutes. The curing was carried out in a nitrogen atmosphere or under a vacuum of $10^{-4}$ Pa.

The heat resistance was determined with a thermogravimetric analyzer and evaluated by determining the point at which the weight of the above varnish of polyamic acid began to reduce at a rate of 3% by weight per 100 minutes as a weight reduction-initiating temperature. As a result of this determination, the weight reduction-initiating temperature of the film cured in vacuum was 465° C., while that of the film cured in a nitrogen atmosphere was 420° C. That is to say, it was apparently observed that the heat resistance of the former was more improved than that of the latter. Further, no difference in weight reduction-initiating temperature due to the difference in the surface material between the both substrates was observed.

The adhesiveness was evaluated based on peeling strength. The peeling strength with respect to the silicon wafer surface was 500 g/cm or above and that with respect to the surface of alumina sputtered on silicon water was 250 g/cm.

EXAMPLE 4

The same evaluation as the one described in Example 3 was repeated except that polyamic acid precursors Nos. 1 to 10 shown in Table 1 were used. The results of the adhesiveness test are shown in Table 2. A good result was obtained in the case where any polyamic acid precursor was used.

EXAMPLE 5

(1) Preparation of a solution of silicone-containing polyimide precursor 8.6505 g (0.0432 mol) of 3,4'-diaminodiphenyl ether, 1.1677 g (0.0048 mol) of 3,4'-diaminodiphenyl ether-3'-carbonamide and 50 g of N,N-dimethylacetamide, which had been purified respectively, were placed in a 300 ml three-necked flask fitted with a thermometer, a stirrer and a calcium chloride drying tube and sufficiently stirred. The flask was cooled in an ice bath. 15.2995 g (0.052 mol) of purified 3,3'4,4'-biphenyl tetracarboxylic dianhydride was added stepwise to the flask over about 10 minutes, while keeping the reaction mixture at a room temperature of about 25° C. The dianhydride adhering to the wall of the flask was washed away with 50.4 g of N,N-dimethylacetamide and added. The mixture was stirred at a room temperature for 3 to 6 hours. 0.16 g of 3-aminopropyldiethoxymethylsilane was added to 40 g of the obtained polyimide precursor (weight percent polymer in solvent: 20) to carry out the reaction for 6 hours. The obtained solution of the polyimide precursor was heated at 60° C. The stirring was discontinued, when the viscosity of the solution reached 23 poise. The preparation of the solution of the polyimide precursor in this Example is corresponding to the above-described synthesis method (B).

(2) Preparation of magnetic head

A thin film magnetic head was produced by the use of the polyimide precursor obtained in the above (1) in a similar manner as described in Example 1. The obtained magnetic head had a flatness of 0.31 μm and the characterization of filming, film defects and magnetic characteristics thereof were all excellent.

EXAMPLE 6

The flatness and adhesiveness of the resin prepared according to the method of the present invention will be described here.

A solution of a polyamic acid represented by the following formula (II):

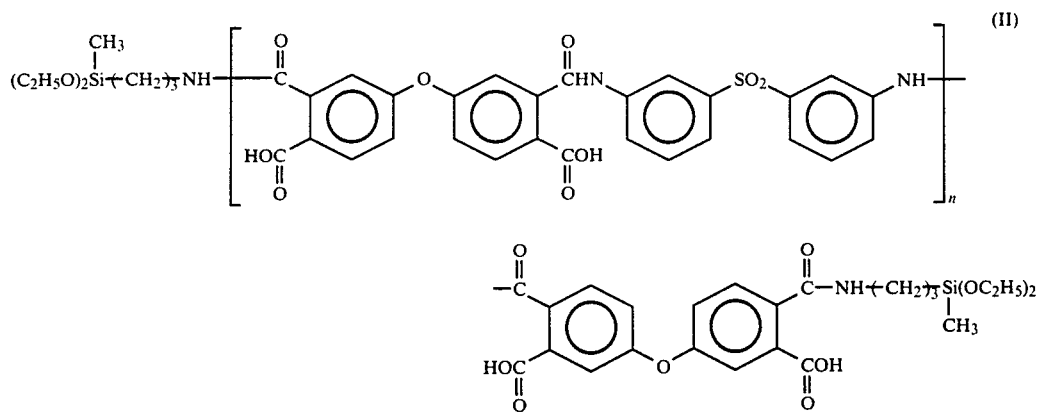

(having a number-average molecular weight of 6000 and n of about 9.8) in dimethylacetamide, which had been prepared in a similar manner as described in Example 5 and had a resin content of 30% by weight, was applied on a silicon wafer having a diameter of 3 inch or a sputtered wafer obtained by stacking an alumina layer having a thickness of 10 μm by sputtering on such a silicon wafer and cured by heating at 350° C. for 30 minutes. The curing was carried out in a nitrogen atmosphere or under a vacuum of $10^{-4}$ Pa.

The heat resistance was determined with a thermogravimetric analyzer and evaluated by determining the point at which the weight of the above varnish of a polyamic acid began to reduce at a rate of 3% by weight per 100 minutes as a weight reduction-initiating temperature. As a result of this determination, the weight reduction-initiating temperature of the film cured in vacuum was 455° C., while that of the film cured in a nitrogen atmosphere was 410° C. That is to say, it was apparently observed that the heat resistance of the former was more improved than that of the latter. Further, no difference in weight reduction-initiating temperature due to the difference in surface material between the both substrates was observed.

The flatness was 0.15 m or below. The adhesiveness was evaluated based on peeling strength. The peeling strength with respect to silicon wafer surface was 300 g/cm, while that with respect to sputtered alumina surface was 350 g/cm. No influence of the curing atmosphere was observed.

EXAMPLE 7

An alumina layer having a thickness 10 μm was stacked by sputtering on a substrate 1 made of $Al_2O_3$-TiC having a thickness of 4 mm and a diameter of 3 inch. A permalloy layer having a thickness of 2 μm was stacked on the alumina layer by sputtering and patterned by photoetching method to form the first magnetic layer 2-1. An alumina layer having a thickness of 0.5 μm was stacked by sputtering on the layer 2-1 and patterned by photoetching method to form an insulating gap layer 3. The same varnish of polyamic acid as the one used in Example 1 was apply by spin coating and heat-cured under a reduced pressure of $10^{-3}$ to $10^{-4}$ Pa. The curing was carried out at 350° C. for 30 minutes. The cured film was patterned with an etching solution comprising a mixture of hydrazine hydrate and ethylenediamine in a ratio by volume of 7:3 in a film thickness of 1.5 μm to form the first insulation layer 4-1. A copper layer having a thickness of 1.5 μm was stacked on the layer 4-1 by sputtering and patterned by photoetching method to form a conductor 5. The second insulation layer 4-2 having a thickness of 4 μm was formed in a similar manner as in the preparation of the first insulation layer 4-1. Then, the second magnetic lyaer 2-2 having a thickness of 2 μm was formed on the layer 4-2 in a similar manner as in the preparation of the first magnetic layer 2-1, followed by stacking of an alumina layer having a thickness of 30 μm by sputtering to form a protective layer 6.

The second magnetic layer 2-2 of the obtained thin film magnetic head had a remarkably flat surface (having a height of an undulation of 0.15 μm or below) and the permeability and magnetic characteristics of the obtained thin film magnetic head were excellent. The magnetic head was subjected to thermal cycle test which comprises exposing it at a room temperature for 30 minutes and at 350° C. for 30 minutes alternately. No film defects such as peeling were observed in the insulation layer, thus obtaining remarkably excellent results in terms of reliability.

EXAMPLE 8

Polyamic acid precursors were prepared by the use of monomer composition Nos. 1 to 5 shown in Table 3 in a similar manner as described in Example 5 and evaluated in a similar manner as described in Examples 6 and 7 to obtain the results Nos. 1 to 5 shown in Table 4. All results were excellent.

TABLE 3

| No. | Synthesis method | Monomer Moles end-capped reagent | Moles diamine | Moles dianhydride | Weight percent Polymer in Solvent | $\overline{Mn}$ | Polymer Formula |
|---|---|---|---|---|---|---|---|
| 1 | B | 3-aminopropyldiethoxy-methylsilane (0.002) | 3,3'-DDS (0.05) | BTDA (0.05) | 30 in DMAc | 6000 | [II] |
| 2 | " | 3-aminopropylethoxy-dimethylsilane (0.002) | 4,4'-DDS (0.05) | BPDA (0.05) | 30 in DMAc | 9000 | [II] |
| 3 | " | p-aminophenyltributoxy-silane (0.002) | 3,3'-DDS (0.05) | BTDA (0.05) | 25 in NMP | 12000 | [II] |
| 4 | " | p-aminophenyldiethoxy-methylsilane (0.004) | 3,3'-DDS (0.05) | DEDA (0.05) | 25 in NMP | 20000 | [II] |
| 5 | " | 3-aminopropyltri-phenoxysilane (0.004) | 4,4'-DDS (0.05) | DEDA (0.05) | 30 in DMAc | 9000 | [II] |

TABLE 4

| No. | Flatness (μm) | Adhesiveness (peeling strength, g/cm) Si wafer surface | Sputtered alumina surface | Characterization of filming | Film defect | Magnetic characteristics |
|---|---|---|---|---|---|---|
| 1 | <0.15 | 300 | 350 | good | Not observed | good |
| 2 | 0.20 | 310 | 400 | good | Not observed | good |
| 3 | 0.21 | 315 | 420 | good | Not observed | good |
| 4 | 0.18 | 300 | 400 | good | Not observed | good |
| 5 | 0.25 | 280 | 400 | good | Not observed | good |

COMPARATIVE EXAMPLE 1

A magnetic head was produced by the same procedure as the one described in Example 1 except that a condensation polymerization type polyimide not containing reactive terminal group of silicone compounds, "PIQ" (a product of Hitachi Chemical Co., Ltd.) was used, followed by evaluation in a similar manner as described in Example 1. The peeling strength with respect to the Si wafer surface was 10 g/cm, while that with respect to the sputtered alumina surface was 90 g/cm, both of which were lower than those of a magnetic head produced by the use of an end capped polyimide with silicone compound. That is to say, the magnetic head produced in this Comparative Example was apparently poor in adhesiveness.

COMPARATIVE EXAMPLE 2

An addition polymerization type polyimide, Thermid 600 (a product of Gulf Oil Chemical Co.) was dissolved in dimethylacetamide to prepare a solution having a resin content of 15% by weight. An insulation layer of a thin film magnetic head was formed by the use of this solution in a similar manner as described in Example 2. No homogeneous coating film was obtained, because of the presence of insoluble components, so that the magnetic characteristics of the obtained magnetic head were poor.

As described above, according to the present invention, a homogeneous insulation layer excellent in flatness can be obtained, because an end capped polyamic acid with silicone compound has a high solubility, thus obtaining a thin film magnetic head of a high reliability which is excellent in magnetic characteristics and free from film defects. Further, an end capped polyamic acid to be used in the present invention exhibits excellent effects when applied to other multi-layered stereo-wiring structure, because of the above advantages.

What is claimed is:

1. A magnetic head wherein an insulation layer of said magnetic head is made of a heat-cured product of an end capped polyimide precursor with organic silicone compound that is a precursor represented by the following general formula [I] or [II] or a mixture thereof:

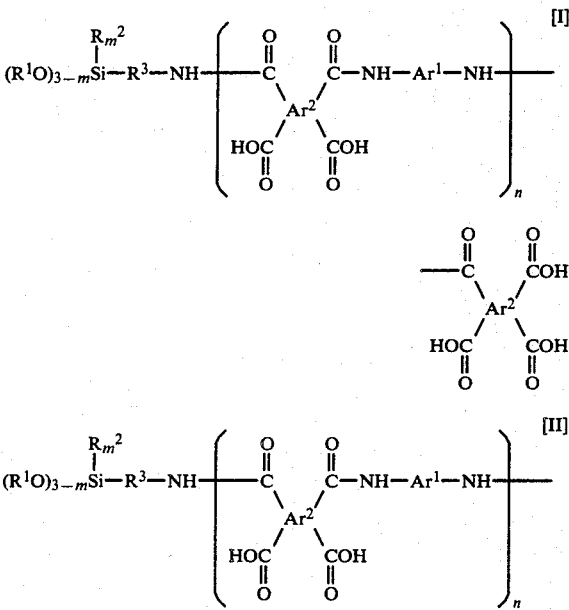

-continued

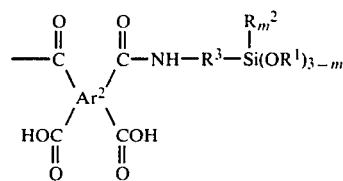

wherein $R^1$, $R^2$ and $R^3$ each stand for an organic radical having 1 to 6 carbon atoms; $Ar^2$ is at least one radical selected from the group consisting of

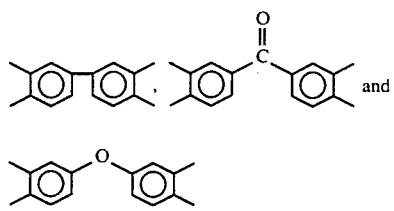

when $Ar^1$ is at one radical selected from the group consisting of

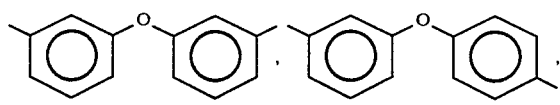

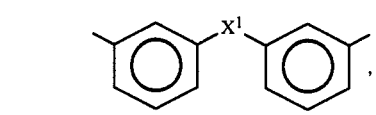

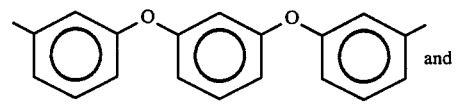

or $Ar^2$ is at least one radical selected from the group consisting of

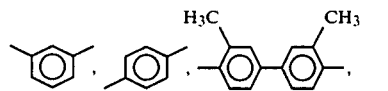

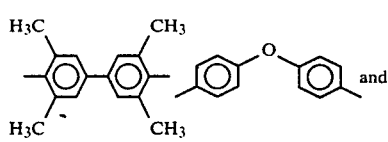

when $Ar^1$ is at least one radical selected from the group consisting of

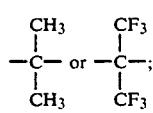

$X_1$ stands for $-SO_2-$ or $-CO-$; $X_2$ is $$-\underset{\underset{CH_3}{|}}{\overset{\overset{CH_3}{|}}{C}}- \quad \text{or} \quad -\underset{\underset{CF_3}{|}}{\overset{\overset{CF_3}{|}}{C}}-;$$

m is 0, 1 or 2 and n stands for a positive number of 1 to 100.

2. A magnetic head as set forth in claim 1, wherein the end capped polyimide precursor with organic silicone compound is a soluble material having high adhesiveness for a head substrate.

3. A magnetic head as set forth in claim 1, wherein $R^1$ is ethyl, propyl or butyl radical; $R^2$ is methyl, ethoxy, propoxy or butoxy radical; $R^3$ is propylene or phenylene radical; $Ar^2$ is

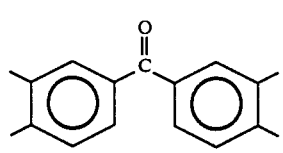

when $Ar^1$ is

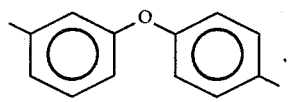

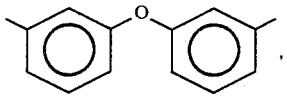

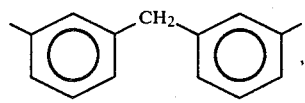

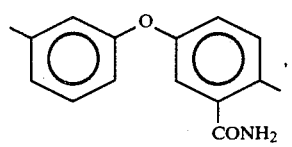

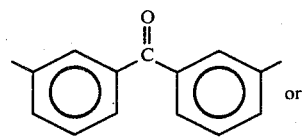

or Ar² is

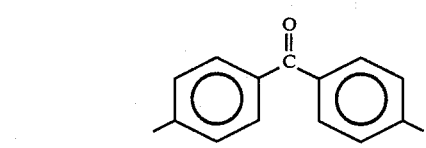

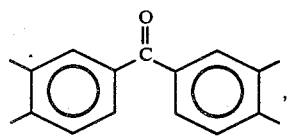

when Ar¹ is

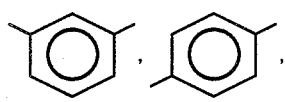

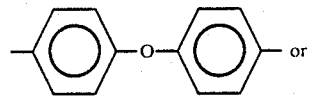 or

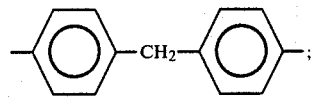

m is 0 or 1 and n is a positive number of 10 to 50.

4. A method of producing a magnetic head comprising a first magnetic layer, an insulating gap layer, a first insulation layer, a conductor layer, a second insulation layer, a second magnetic head, and a protective layer which are stacked on a substrate in order, which comprises forming the first and second insulation layers by curing an end capped polyimide precursor with organic silicone compound in vacuum; the end capped polyimide precursor with organic silicone compound being a precursor represented by the following general formulae [I] or [II] or a mixture thereof:

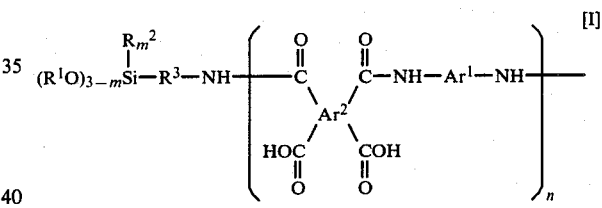

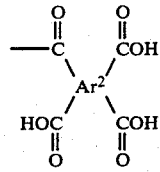

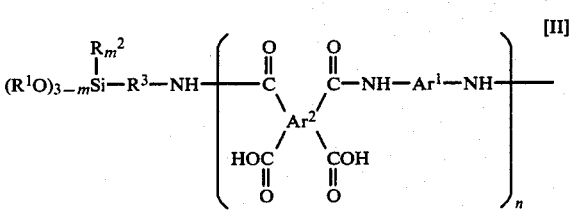

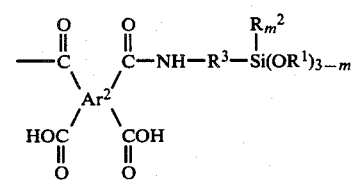

wherein R¹, R² and R³ each stand for an organic radical having 1 to 6 carbon toms; Ar² is at least one radical selected from the group consisting of

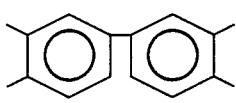

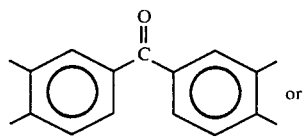 or

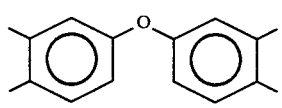

when Ar¹ is at least one radical selected from the group consisting of

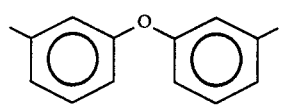

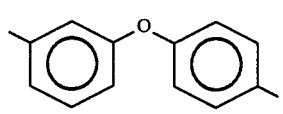

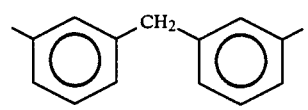

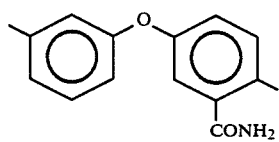

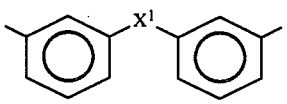

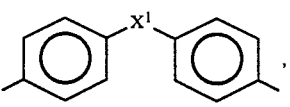

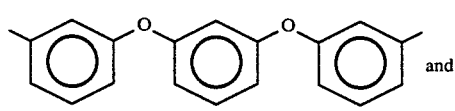 and

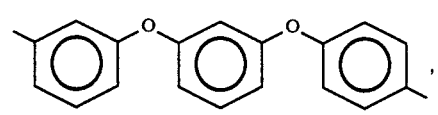, or Ar² is at least one radical selected from the group consisting of

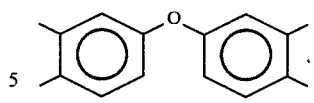

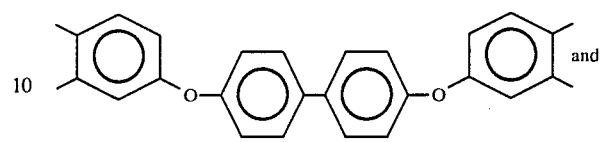 and

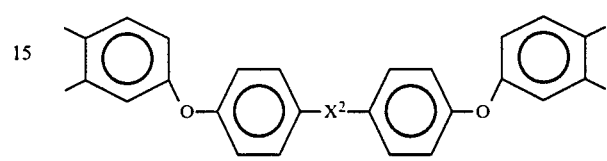

when Ar¹ is at least one radical selected from the group consisting of

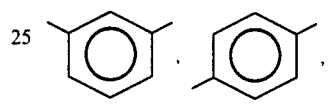,

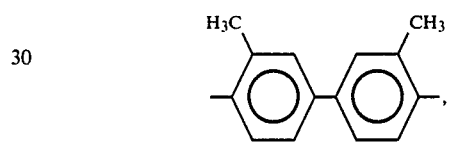,

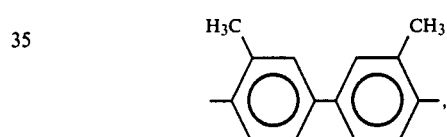,

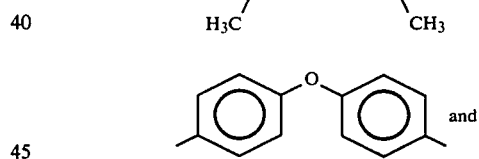 and

;

$X_1$ stands for —SO₂— or —CO—; $X_2$ is $$-\underset{\underset{CH_3}{|}}{\overset{\overset{CH_3}{|}}{C}}- \text{ or } -\underset{\underset{CF_3}{|}}{\overset{\overset{CF_3}{|}}{C}}-;$$

m is 0, 1, or 2 and n is a positive number of 1 to 100.

5. A method of producing a magnetic head as set forth in claim 4, wherein the end capped polyimide precursor with organic silicone compound is a soluble material having a high adhesiveness to the substrate.

6. A method of producing a magnetic head as set forth in claim 4, wherein R¹ is methyl, ethyl, propyl or butyl radical; R² is methyl, methoxy, ethoxy, propoxy or butoxy radical; R³ is propylene or phenylene radical; Ar²

 or
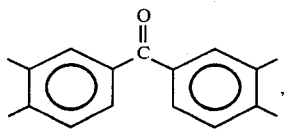,
when Ar¹ is
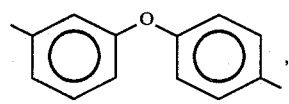,
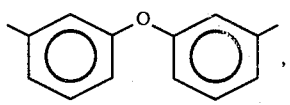,
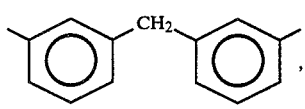,
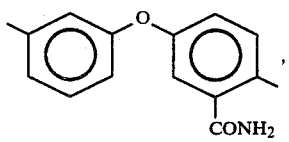,
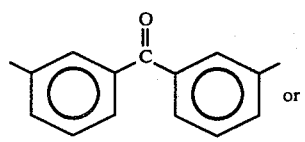 or
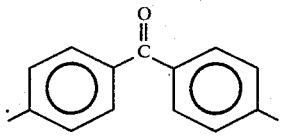
or Ar² is
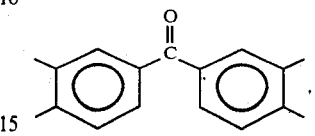,
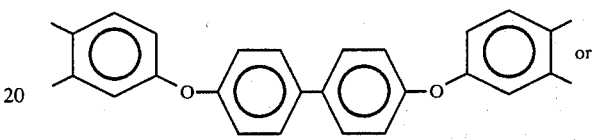 or
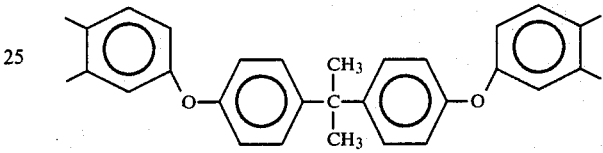
when Ar¹ is
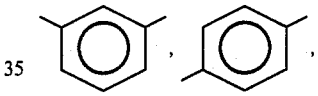,
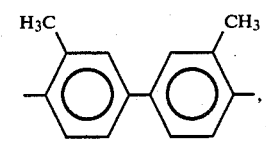,
 or
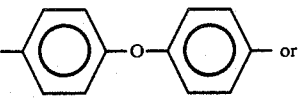;
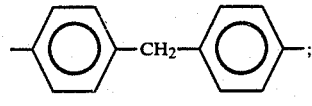
m is 0 or 1 and n is a positive number of 10 to 50.
* * * * *